Nov. 7, 1950 — L. S. ADAMS — 2,528,986
AERIAL SEED DISTRIBUTOR
Filed May 24, 1945 — 2 Sheets-Sheet 1
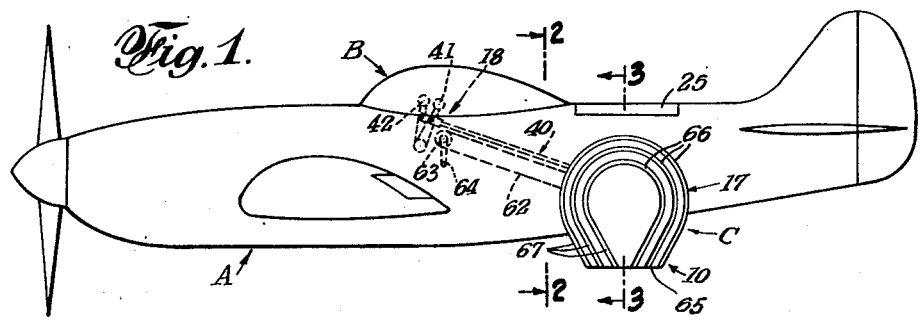
INVENTOR
LYTLE S. ADAMS
BY
ATTORNEY Nov. 7, 1950 L. S. ADAMS 2,528,986
AERIAL SEED DISTRIBUTOR
Filed May 24, 1945 2 Sheets-Sheet 2
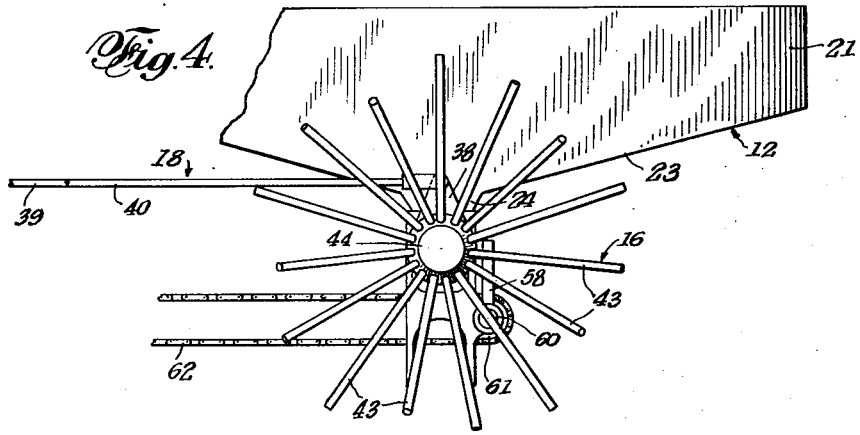
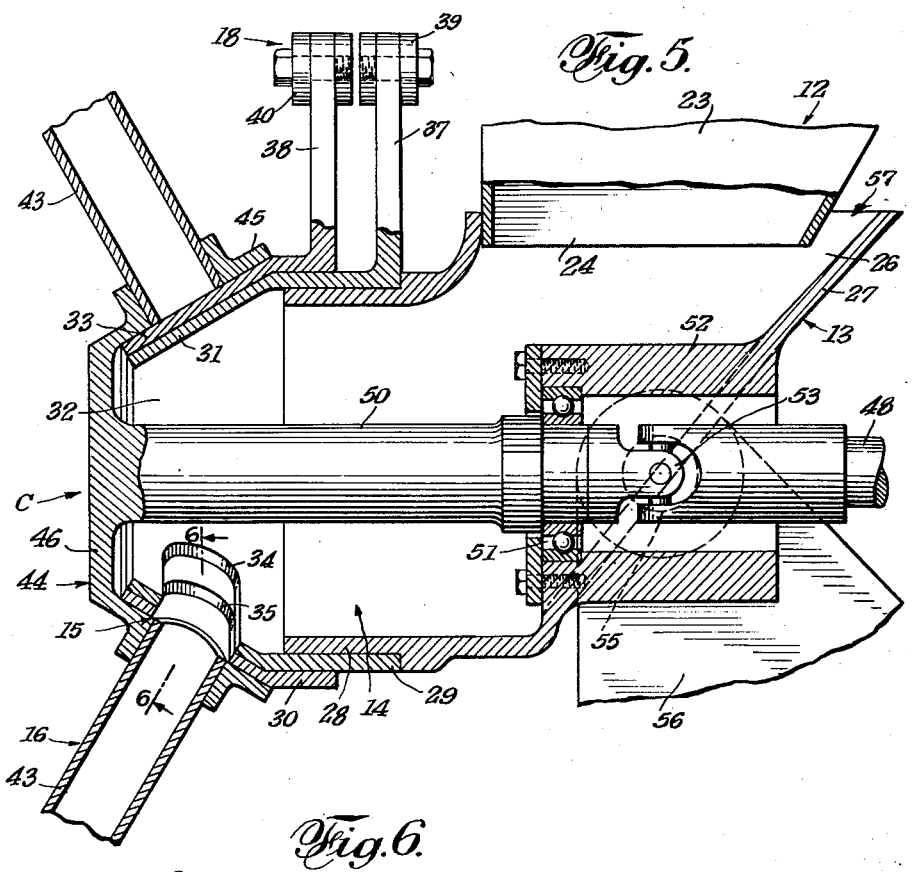
INVENTOR
LYTLE S. ADAMS
BY
ATTORNEY Patented Nov. 7, 1950

2,528,986

UNITED STATES PATENT OFFICE 2,528,986

AERIAL SEED DISTRIBUTOR

Lytle S. Adams, Los Angeles, Calif.

Application May 24, 1945, Serial No. 595,633

24 Claims. (Cl. 275—8)

This invention relates to a mechanism for distributing seeds and deals more particularly with an aerial seed distributor for sowing or planting large areas.

Seeding or reforestation of large areas and particularly of mountainous or rough areas is difficult, costly and time consuming. Such areas are usually quite inaccessible and require the time of many people and entail the use of much costly equipment, not only for actual seeding but merely to reach them. My invention seeks to simplify the seeding of large areas for reforestation, or like operations, by providing effective aerial means for distributing seed to such areas quickly and at relatively low cost. My invention may also be advantageously employed for quickly and inexpensively sowing seeds in other large areas such as large arable tracts, etc.

An object of my invention is to provide an aerial seed distributor which requires only one person to fly and operate the same and by means of which large inaccessible areas can be seeded quickly and effectively with resulting economy of time and money.

Another object of my invention is to provide airborne means for distributing, planting or sowing seed to large areas and in controlled quantities according to specific local requirements.

Another object of my invention is to provide an airborne seed distributor which dstributes seed in a regular controllable pattern to obtain desired seed distribution.

A further object of my invention is to provide an airborne seed distributor which is adjustable to vary both the quantity of seed distributed to an area and the width or size of the row or strip being seeded.

A still further object of my invention is to provide seed apparatus which is adjustable as above stated and which involves aerial means of transportation variable as to height and speed to control the width of the row being seeded and the amount of seed being distributed.

A still further object of my invention is to provide an aerial seed distributor having means for propelling the seed for suitable ground penetration irrespective of the height at which the distributor is flown.

The various objects and features of my invention will be fully understood from the following detailed description of a typical preferred form and application of my invention, throughout which description reference is made to the accompanying drawings, in which:

Fig. 1 is a side view of an aeroplane and seed distributor as provided by my invention;

Fig. 2 is a sectional view as taken on the line 2—2 of Fig. 1 and showing the manner of propelling seeds from the distributor;

Fig. 3 is an enlarged sectional view as taken on the line 3—3 of Fig. 1;

Fig. 4 is a fragmentary side view showing parts of my invention and in particular the rotating seed distributor and its drive and control;

Fig. 5 is a further enlarged detailed sectional view of a portion of the mechanism shown in Fig. 3; and Fig. 6 is a fragmentary cross sectional view as taken on the line 6—6 of Fig. 5.

According to my invention, the seeds which I prefer to employ in my distributor are placed in and protected by tubes, pellets or capsules. I prefer to employ capsules of a heavy metallic material such as lead. The seeds are embedded in earth or any other suitable medium carried by the capsules. Such seed pellets have ground penetrating weight and protect the seeds from injury. It is to be understood that the capsules are open at some point or are perforated so that, upon germination, the seed may take root and grow without serious interference from the capsule. The seed, of course, need not be encased or weighted as above set forth if it is of sufficient weight to satisfactorily plant itself without injury.

In the drawings I have shown a typical aeroplane which, together with the distributing machine, forms the apparatus of my invention. The aeroplane has a conventional fuselage A and a cabin or cockpit B. I have mounted the seed distributor C on the fuselage A and in this case, somewhat to the rear of the cockpit B.

The seed distributor C may be designed in various ways. The present design involves a structure which is symmetrical on both sides of a vertical plane extending longitudinally through the center of the fuselage A and comprises two similar but opposed seed distributing mechanisms or elements 10 and 11 discharging their seed pellets from opposite sides of the fuselage A.

Each of the mechanisms 10 and 11 may be said to comprise, generally, a seed pellet hopper 12; a chute 13 for said hopper discharging into a chamber 14; gate means 15 for controlling the amount of seed pellets discharged from said chamber into a pellet slinger or projector 16; a pellet discharge hood 17 mounted on the outside of the fuselage A and housing the pellet projector 16; and means 18 controlled from the cockpit for adjusting the operative size of the gate means 15. In addition to the elements named the mechanisms are combined with a common driving means 19 for the pellet projectors, means 20 common to both mechanisms 10 and 11 and controlled from the cockpit for adjusting the pellet projecting direction of the pellet projectors 16; various supports and brackets for mounting the distributor C in the fuselage A; and other details and parts hereinafter described.

The seed pellet distributing mechanisms 10 and 11 may be alike and therefore I will describe but one of them, for example, the mechanism 10, such description being also applicable to mechanism 11.

The hopper 12 is located within the fuselage A and extends longitudinally along and is secured to one side of said fuselage. The hopper 12 comprises an elongated receptacle 21 having an open top 22 and a progressively restricted lower part 23 terminating in a relatively small downwardly directed discharge spout 24 at the lowermost point of said hopper. I may afford access to the open top 22 of the hopper from the outside of the fuselage by providing doors 25 or the like, in said fuselage. The hopper 12 can be filled by opening said doors 25 and pouring seed pellets therein through its open top.

The chute 13 into which the spout 24 discharges may be variously made. I have shown said chute as comprising a hollow or otherwise suitably formed element having an open flared top part 26 into which the hopper spout 24 projects and in which it loosely fits. The chute 13 is provided with a downwardly and outwardly directed wall 27 extending from the open top 26 to the bottom of the chute, said wall serving to direct seed pellets received by the chute to the tubular chamber 14 which opens outwardly and which is defined by a cylindrical wall 28 projecting laterally through an enlarged opening D provided in the fuselage A.

In its present form the gate means 15 comprises two sleeves 29 and 30, one arranged within the other. The inner sleeve 29 is engaged over and is carried by the cylindrical wall 28 of the chamber 14. Said inner sleeve 29 has an open-ended tapering or conical sleeve portion 31 which extends outwardly laterally to enclose a lateral extension 32 of the chamber 14. The sleeve 30 has an open-ended conical sleeve portion 33 fitting over the conical portion 31 of the sleeve 29. The conical sleeve portions 31 and 33 are provided with arcuate registerable openings 34 and 35, respectively, said openings being directed generally downward and outward. By adjusting the angular position of the opening 34 with respect to the opening 35, I obtain a through gate port 36 comprising portions of both openings. The gate port 36 can be varied in size to control its capacity to pass seed pellets. The angular position of the opening 35 can also be adjusted so that the adjusted gate port 36 can itself be variably positioned along any point of the arc of adjustment of the conical sleeve part 33. As seen in Figs. 5 and 6, the gate port 36 is positioned at the lowermost point of the extension chamber 32 and seed pellets in said chamber will readily fall by gravity through the gate port in quantities commensurate to the adjusted size of said gate port. By moving the gate port around in either direction from the position shown, it can be placed at higher points of the arc of adjustment and instead of being downwardly directed it may be angularly directed and will be in an advanced or in a retarded position.

I provide the means 18 for effecting the above-described adjustments of the size and position of the gate. The means 18 which I have shown comprises upwardly directed rigid arms 37 and 38 on the sleeves 30 and 31, respectively, links 39 and 40 connected to the arms 37 and 38, respectively, and extending to the cockpit B, and control levers 41 and 42 in the cockpit connected to the other ends of the links 39 and 40, respectively. By suitable manipulation of the control levers 41 and 42, the person operating the aeroplane can adjust the relative angular positions of the sleeves 29 and 30 to obtain desired size and angular position of the gate port 36.

The seed pellets are discharged through the gate port 36 into the pellet projector 16. In the form shown said pellet projector comprises generally, a plurality of radially disposed tubes 43 carried by a central hub 44. The hub 44 is formed as a conical cup having a conical wall 45 fitting over the conical sleeve portion 33, and a flat circular wall 46 which serves as a side closure for the extension chamber 32. The tubes 43 extend radially from said conical wall 45 and terminate at their inner ends in registerable relationship to the gate port 36 whereby, upon rotation of the pellet projector, seed pellets passing through said gate port 36 will be directed into said tubes 43, and will be centrifugally directed outwardly from the outer ends of said tubes 43.

I provide the driving means 19 for rotating the pellet projector 16 at a rate of speed sufficient to make the centrifugal force effective for proper ground penetration of the seed pellets propelled from the projector. For this purpose I have provided a motor 47 or other suitable power means which I utilize for driving the pellet projectors of both seed distributing mechanisms 10 and 11. The motor has drive shafts 48 and 49 for the mechanisms 10 and 11, respectively.

The hub wall 46 is provided with a central stub shaft 50 which extends through the pellet chambers 32 and 14 and which is guided for rotation in a ball bearing 51 carried by a hollow boss 52 formed in the wall 27 of the chute 13. In the present instance, I provided a universal joint 53, or the like, connecting the motor shaft 48 and the stub shaft 50 to effect a rotational drive of the pellet projector 16 by the motor.

I desire to obtain even distribution of the pellets in the ground so they are generally uniformly distributed throughout the width of a row or strip being seeded, as indicated in Fig. 2. I therefore variously direct or bend the tubes 43 of the pellet projector 16 so that some of the tubes propel the seed pellets directly outwardly, some propel seed pellets outwardly and slightly angularly, and others propel seed pellets outwardly and still more angularly outward. In this manner, as illustrated, each distributor mechanism plants a seed-distributed row or strip and the strips of the two mechanisms together form a wider seed-planted row. Since the seed pellets travel divergent paths from the distributors 10 and 11 toward the ground, the altitude at which the aeroplane is flown will determine the spread of the seeds and the ultimate width of the planted row. However, as shown in Fig. 2, the spaces X between the lines of seeds being planted by the distributors 10 and 11 will vary with the height of the aeroplane, and the space Y between the rows of seeds planted by said distributors 10 and 11 will remain the same for any altitude of said aeroplane.

The means 20 is provided for adjusting the pellet projecting direction of the pellet projector 16 so that the width of the space Y can be adjusted to the width of the spaces X to obtain uniformity of planting.

The means 20 which I show includes a pivot 55 for the chute 13 whereby the chute, which carries the gate 15 and the pellet projector 16, can be tilted in a plane transverse to the fuselage A to vary the direction of propulsion of the seed pellets from said pellet projector. The pivot 55 is aligned with the universal joint 53 so that driving connection between the motor shaft 48 and the stud shaft 50 is effective under variable angular positions of said chute 13. I provide a suitable bracket 56 mounted in the fuselage to carry the pivot 55. I also provide suitable adjustment clearance 57 between the spout 26 and the upper end of the angled chute wall 27 to permit limited pivotal movement of the chute 13 around its pivot 55. The means 20 further includes a worm gear segment 58 on the pivot 55 and a worm 59 carried by a shaft 60 meshes with the segment 58. The shaft 60 is mounted transversely in the fuselage A in the bracket 56, and a sprocket wheel 61 is carried by the shaft 60. Rotational adjustment of the sprocket wheel 61 will cause the worm 59 and segment 58 to tilt or pivot the chute 13 around its pivot 55. Accordingly, the pellet projecting direction of the pellet projector tubes 43 is changed to vary the width of the space Y. The control of the rotational adjusting movement of the sprocket wheel 61 is obtained through a chain 62 trained around said sprocket wheel and around a sprocket wheel 63 in the cockpit B. A suitable control handle 64 operates the sprocket wheel 63.

The tubes 43 may direct the seed pellets outwardly in all directions. I desire, however, to direct said seed pellets downwardly only. For this purpose I have provided the hood 17 which encloses the pellet projector 16 and which has a bottom discharge opening 65. The hood 17 is formed with substantially semi-circular peripheral walls 66 arranged in stepped relation so that each respective wall 66 acts as a fixed closure for the moving open ends of the variously angled tubes 43. It is apparent that seed pellets under centrifugal force seeking exit from the tubes 43, will encounter the respective walls 66 and be retained from outward propulsion. Each of the semi-circular walls 66 at both ends thereof, extends as a straight wall 67 terminating at the hood discharge opening 65. As the end of each tube 43 leaves its respective semi-circular wall 66 and is directed toward its respective straight wall 67, centrifugal force will become effective to propel seed pellets in said tube outwardly through the discharge opening 65. The hood 17 may be variously formed to obtain desired directive propulsion of the pellets through its discharge opening. Said opening may be downwardly directed, as shown, or directed either forward or backward at various angles. Since the pellet projector 16 is capable of being adjusted as above described, the walls 66 are formed on spherical radii with the pivot 55 as a center so that said walls serve as closures for the various tubes 43 in any adjusted position of the pellet projector 16.

The aerial seed pellet distributor which I have described will function to distribute seed to large areas. Its flexibility of adjustment, including the ability to vary the altitude from which the pellets are propelled, affords a wide range of use for planting different types of seeds under varying conditions. It is apparent that by means of my seed distributor, the seeding or re-seeding of large areas is easily and quickly accomplished with an attending economy of time and cost.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A seed pellet distributor including the fuselage of an aeroplane, and similar but oppositely arranged distributors carried by said fuselage, each distributor including a seed pellet hopper within the fuselage, a chute receiving seed pellets from said hopper within the fuselage and having a seed pellet receiving chamber directed through an opening in said fuselage, an adjustable gate controlling the quantity of seed pellets passing from said chamber, and a centrifugal seed pellet projector receiving seed pellets from said chamber through said gate.

2. A seed pellet distributor including the fuselage of an aeroplane, and similar but oppositely arranged distributors carried by said fuselage, each distributor including a seed pellet hopper within the fuselage, a chute receiving seed pellets from said hopper within the fuselage and having a seed pellet receiving chamber directed through an opening in said fuselage, an adjustable gate controlling the quantity of seed pellets passing from said chamber, a centrifugal seed pellet projector receiving seed from said chamber through said gate and located outside of said fuselage, and a hood for said projector and having a seed pellet discharge opening.

3. A seed pellet distributor including the fuselage of an aeroplane, and similar but oppositely arranged distributors carried by said fuselage, each distributor including a seed pellet hopper within the fuselage, a chute receiving seed pellets from said hopper within the fuselage and having a seed pellet receiving chamber directed through an opening in said fuselage, an adjustable gate controlling the quantity of seed pellets passing from said chamber, and a centrifugal seed pellet projector receiving seed pellets from said chamber through said gate, said seed pellet projector including a plurality of substantially radially arranged tubes receiving pellets from said chamber to project them centrifugally outward.

4. A seed pellet distributor including the fuselage of an aeroplane, and similar but oppositely arranged distributors carried by said fuselage, each distributor including a seed pellet hopper within the fuselage, a chute receiving seed pellets from said hopper within the fuselage and having a seed pellet receiving chamber directed through an opening in said fuselage, an adjustable gate controlling the quantity of seed pellets passing from said chamber, a centrifugal seed pellet projector receiving seed from said chamber through said gate and located outside of said fuselage, said seed pellet projector including a plurality of substantially radially arranged tubes receiving pellets from said chamber to project them centrifugally outward, and a hood housing the projector and having a seed pellet discharge opening.

5. In a seed pellet distributor, a hopper, a chute receiving seed pellets from said hopper and having a seed pellet receiving chamber, a centrifugal seed pellet projector carried by the chute receiving seed pellets from said chamber and including a distributor having an axis about which it rotates, means controlling the quantity of seed pellets passing from said chamber to said projector, and means operable to adjust the axis of the distributor to vary the direction in which the pellets are discharged varying the operative position of said projector.

6. In a seed pellet distributor, a hopper, a chute receiving seed pellets from said hopper and having a seed pellet receiving chamber, a centrifugal seed pellet projector carried by the chute receiving seed pellets from said chamber and including a plurality of radially directed tubes arranged on a normal horizontal axis, means for tilting the axis of said projector to cause a corresponding change in the direction of said tubes, and means controlling the quantity of seed pellets passing from the chamber to the projector.

7. In a seed pellet distributor, a hopper terminating in a discharge spout, a chute positioned beneath the spout to receive seed pellets therefrom, means for tilting said chute with respect to said spout, a centrifugal seed pellet projector carried by the chute, means for rotating said projector, and means for controlling the quantity of seed pellets passing from the chute to said projector.

8. In a seed pellet distributor, a hopper terminating in a discharge spout, a chute positioned beneath the spout to receive seed pellets therefrom, means for tilting said chute with respect to said spout, an inner sleeve carried by the end of said chute remote from the spout, an outer sleeve carried by the inner sleeve, said sleeves having registerable arcuate openings, means for rotationally adjusting said sleeves to vary the flow of seed pellets through the registered openings, a centrifugal seed pellet projector carried by the outer sleeve, and means for rotating said projector.

9. An aerial seed pellet distributor including the fuselage of an aeroplane, a seed pellet projector carried by the fuselage and being rotatable on a horizontally arranged axis to propel seed pellets downwardly to penetrate the ground, the projector including variously angled radially arranged tubes, means for rotating said projector whereby seed pellets in said tubes are propelled centrifugally outward in diverging lines as directed by the variously angled tubes, and means for adjusting the position of said projectors to vary the direction of said diverging lines of seed pellets.

10. A seed pellet planter including, the fuselage of an aeroplane, a pellet hopper within the fuselage, a chute receiving pellets from the hopper, a rotary centrifugal pellet projector rotating on a substantially horizontal axis transverse of the aeroplane receiving pellets from the chute and throwing them downward in a predetermined direction to penetrate the ground beneath the planter, and means controlling the flow of pellets between the hopper and the projector.

11. A seed pellet distributor including, the fuselage of an aeroplane, a pellet hopper within the fuselage, a chute receiving pellets from the hopper, a pellet projector rotating on a substantially horizontal axis receiving pellets from the chute and throwing them downwardly to penetrate the ground beneath the distributor, and means operable to vary the axis of the projector to control the direction in which pellets are discharged.

12. A seed pellet distributor including, the fuselage of an aeroplane, a pellet hopper within the fuselage, a chute receiving pellets from the hopper, a pellet projector rotating on a substantially horizontal axis receiving pellets from the chute and throwing them downwardly to penetrate the ground beneath the distributor, means controlling the flow of pellets between the hopper and the projector, and means operable to vary the axis of the projector to control the direction in which pellets are discharged.

13. A seed pellet planter including, a pellet hopper, a chute receiving pellets from the hopper, and a rotating centrifugal pellet projector on an axis transverse of the planter and acting to throw the pellets in a fixed direction from the planter and having a substantially horizontal axis of rotation and operating to receive pellets from the chute and throw them downwardly.

14. A seed pellet planter including, a pellet hopper, a chute receiving pellets from the hopper, a rotating centrifugal pellet projector acting to throw the pellets in a fixed direction from the planter and having a substantially horizontal axis of rotation and operating to receive pellets from the chute and throw them downwardly, and means controlling flow of pellets from the hopper to the projector.

15. A seed pellet distributor including, a pellet hopper, a chute receiving pellets from the hopper, a rotating pellet projector acting to throw the pellets from the distributor and having a substantially horizontal axis of rotation and operating to receive pellets from the chute and throw them downwardly, and means operable to vary the axis of the projector to control the direction in which pellets are discharged.

16. A seed pellet distributor including, a pellet hopper, a chute receiving pellets from the hopper, a rotating pellet projector acting to throw the pellets from the distributor and having a substantially horizontal axis of rotation and operating to receive pellets from the chute and throw them downwardly, means operable to vary the axis of the projector to control the direction in which pellets are discharged, and means controlling flow of pellets from the hopper to the projector.

17. A planter for seed pellets comprising a vehicle adapted for substantially horizontal movement over a field to be planted having a body, means for carrying seed pellets in said body, a rotating seed pellet projector carried on the outside of the body on a substantially horizontal axis transverse of the vehicle and directing seeds downwardly from the vehicle to travel in a predetermined trajectory, and means between the seed pellet carrying means and the projector for controlling the amount of seed pellets entering the projector from the seed pellet carrying means.

18. A planter for seed pellets comprising a vehicle adapted for substantially horizontal movement over a field to be planted and having a body, means for carrying seed pellets in said body, a rotating seed pellet projector carried on the outside of the body on a substantially horizontal axis transverse of the body, and means between the seed pellet carrying means and the projector for controlling the amount of seed pellets entering the projector from the seed pellet carrying means and including an adjustable gate mechanism having a variable port.

19. A planter for seed pellets comprising a vehicle adapted for substantially horizontal movement over a field to be planted and having a body, means for carrying seed pellets in said body, a rotating seed pellet projector carried on the outside of the body on a substantially horizontal axis transverse of the body, and means for controlling the amount of seed pellets entering the projector from the first mentioned means including, an adjustable gate mechanism having a variable seed pellet passing port and operating means for varying the size of said port.

20. A planter for seed pellets comprising a vehicle adapted for substantially horizontal movement over a field to be planted and having a body, pellet carrying means in said body, a rotating seed pellet projector carried on the outside of the body on a substantially horizontal axis transverse of the body, and means controlling the amount of seed pellets entering the projector from the pellet carrying means including an adjustable gate mechanism having a variable seed pellet passing port and located between the seed pellet carrying means and the projector, and operating means for varying the size of said port having a control part located in the body of said vehicle.

21. A seed pellet planter including the body of a vehicle, a revolving seed pellet projector carried by the body with a pellet delivering portion at the exterior of the body, the projector being on a horizontally arranged axis transverse of the vehicle to propel seed pellets downwardly to penetrate the ground, and means for adjusting the seed propelling direction of said projector.

22. An aerial seed pellet distributor including, the fuselage of an aeroplane, a rotating seed pellet projector carried by the fuselage and arranged to propel seed pellets downwardly therefrom to penetrate the ground, the projector including variously angled radially arranged tubes, means for rotating said projector whereby seed pellets in said tubes are propelled centrifugally outward in diverging lines as directed by the variously angled tubes, means for adjusting the position of the axis of said projector to vary the direction of said diverging lines of seed pellets, and a hood for the projector having pellet controlling walls surrounding the outer ends of said tubes and having a discharge opening through which said seed pellets are propelled.

23. An aerial seed pellet distributor including the fuselage of an aeroplane, a rotating seed pellet projector carried by the fuselage and arranged to propel seed pellets downwardly from the fuselage to penetrate the ground, the projector including variously angled radially arranged tubes, means for rotating said projector whereby seed pellets in said tubes are propelled centrifugally outward in diverging lines as directed by the variously angled tubes, means for adjusting the axis of said projector to vary the direction of said diverging lines of seed pellets, and a hood having semi-circular pellet controlling walls surrounding the outer ends of said tubes and having a discharge opening through which said seed pellets are propelled.

24. An aerial seed pellet distributor including the fuselage of an aeroplane, a rotatable seed pellet projector carried by the fuselage and arranged to propel seed pellets downwardly from the fuselage to penetrate the ground, the projector including variously angled radially arranged tubes, means for rotating said projector whereby seed pellets in said tubes are propelled centrifugally outward in diverging lines as directed by the variously angled tubes, means for adjusting the axis of said projector to vary the direction of said diverging lines of seed pellets, and a hood having semi-circular pellet controlling walls surrounding the outer ends of said tubes and converging straight connecting walls terminating in a discharge opening through which said seed pellets are propelled.

LYTLE S. ADAMS.

REFERENCES CITED

The following references are of record in the file of this patent:

UNITED STATES PATENTS

| Number | Name | Date |
| --- | --- | --- |
| 14,630 | Lawrenson | Apr. 8, 1856 |
| 154,842 | Codville | Sept. 8, 1874 |
| 1,019,609 | Derdeyn | Mar. 5, 1912 |
| 1,732,406 | Junkers | Oct. 22, 1929 |
| 1,751,928 | Lachner | Mar. 25, 1930 |
| 1,787,397 | Savage | Dec. 30, 1930 |
| 2,052,626 | Houghton | Sept. 1, 1936 |
| 2,303,856 | Mitchell et al. | Dec. 1, 1942 |
| 2,334,376 | Bauer | Nov. 16, 1943 |
| 2,430,020 | Johnson | Nov. 4, 1947 |

FOREIGN PATENTS

| Number | Country | Date |
| --- | --- | --- |
| 660,465 | France | Feb. 19, 1929 |

OTHER REFERENCES

Publication, "Science and Invention," March 1927, page 1009. Classified in class 111, subclass 1.